US007770806B2

(12) United States Patent
Herzon et al.

(10) Patent No.: US 7,770,806 B2
(45) Date of Patent: Aug. 10, 2010

(54) TEMPERATURE CONTROL IN VARIABLE-CAPACITY HVAC SYSTEM

(75) Inventors: Aaron D. Herzon, Ballwin, MO (US);
Allan J. Reifel, Florissant, MO (US)

(73) Assignee: Nordyne Inc., O'Fallon, MO (US)

( * ) Notice: Subject to any disclaimer, the term of this patent is extended or adjusted under 35 U.S.C. 154(b) by 485 days.

(21) Appl. No.: 11/820,521

(22) Filed: Jun. 19, 2007

(65) Prior Publication Data
US 2008/0314998 A1  Dec. 25, 2008

(51) Int. Cl.
*F24F 11/053* (2006.01)
(52) U.S. Cl. ............ 236/1 C; 62/228.1; 62/228.4
(58) Field of Classification Search ......... 62/228.1, 62/228.4; 236/1 C; 700/276, 299, 300
See application file for complete search history.

(56) References Cited

U.S. PATENT DOCUMENTS

| 4,015,182 | A |   | 3/1977  | Erdman           |
|-----------|---|---|---------|------------------|
| 4,099,553 | A |   | 7/1978  | Burnham et al.   |
| 4,143,415 | A | * | 3/1979  | Klingbeil ......... 700/8 |
| 4,193,006 | A | * | 3/1980  | Kabat et al. ...... 307/117 |
| 4,250,544 | A |   | 2/1981  | Alley            |
| 4,257,238 | A |   | 3/1981  | Kountz et al.    |
| 4,298,943 | A |   | 11/1981 | Tompson et al.   |
| 4,346,434 | A |   | 8/1982  | Morinaga         |
| 4,390,826 | A |   | 6/1983  | Erdman et al.    |
| 4,415,844 | A |   | 11/1983 | Mendenhall et al.|
| 4,421,268 | A |   | 12/1983 | Bassett et al.   |
| 4,434,390 | A |   | 2/1984  | Elms             |
| 4,457,706 | A |   | 7/1984  | Finke et al.     |
| 4,459,519 | A |   | 7/1984  | Erdman           |
| 4,467,998 | A |   | 8/1984  | Spence           |
| 4,487,363 | A |   | 12/1984 | Parker et al.    |
| 4,495,450 | A |   | 1/1985  | Tokizaki et al.  |
| 4,500,034 | A |   | 2/1985  | Reese et al.     |
| 4,500,821 | A |   | 2/1985  | Bitting et al.   |
| 4,507,932 | A |   | 4/1985  | Suzuki et al.    |
| 4,530,395 | A |   | 7/1985  | Parker et al.    |
| 4,540,921 | A |   | 9/1985  | Boyd, Jr. et al. |
| 4,576,012 | A |   | 3/1986  | Luzenberg        |
| 4,605,160 | A |   | 8/1986  | Day              |

(Continued)

FOREIGN PATENT DOCUMENTS

DE    3541277    5/1987

(Continued)

*Primary Examiner*—George Nguyen
(74) *Attorney, Agent, or Firm*—Bryan Cave LLP

(57) ABSTRACT

Relatively constant temperatures are maintained in a space by varying the capacity of heating or cooling equipment. A proportional band is used to adjust capacity to compensate for changes in heating or cooling load, and the proportional band is adjusted to bring the actual temperature within the space closer to the set point temperature. Such an adjustment may be made by determining the difference between the present temperature and the set point temperature, and adjusting a floating temperature set point by a percentage (e.g., ten percent) of the difference. Such a process may be repeated, for example, at regular intervals, such as once per minute. As a result, the temperature within the space approaches (e.g., asymptotically) the set point temperature whether the heating or cooling load is high or low. Methods, systems, and apparatuses are contemplated, including HVAC units and controls, including for residential applications, including using variable-speed drives.

25 Claims, 3 Drawing Sheets

U.S. PATENT DOCUMENTS

| | | |
|---|---|---|
| 4,616,325 A | 10/1986 | Heckenbach et al. |
| 4,630,221 A | 12/1986 | Heckenbach et al. |
| 4,636,936 A | 1/1987 | Boyd, Jr. et al. |
| 4,638,233 A | 1/1987 | Erdman |
| 4,642,536 A | 2/1987 | Boyd, Jr. et al. |
| 4,642,537 A | 2/1987 | Young |
| 4,648,551 A | 3/1987 | Thompson et al. |
| 4,651,068 A | 3/1987 | Meshkat-Razavi |
| 4,653,285 A | 3/1987 | Pohl |
| 4,667,480 A | 5/1987 | Bessler |
| 4,667,874 A | 5/1987 | Johnson et al. |
| 4,669,040 A | 5/1987 | Pettit et al. |
| 4,674,027 A * | 6/1987 | Beckey ........................ 700/14 |
| 4,674,291 A | 6/1987 | Kitauchi |
| 4,682,473 A | 7/1987 | Rogers, III |
| 4,688,547 A | 8/1987 | Ballard et al. |
| 4,699,570 A | 10/1987 | Bohn |
| 4,706,553 A | 11/1987 | Sharp et al. |
| 4,712,050 A | 12/1987 | Nagasawa et al. |
| 4,713,744 A | 12/1987 | Coston |
| 4,718,021 A | 1/1988 | Timblin |
| 4,722,018 A | 1/1988 | Pohl |
| 4,736,143 A | 4/1988 | Nakamura et al. |
| 4,743,815 A | 5/1988 | Gee et al. |
| 4,749,881 A | 6/1988 | Uhrich |
| 4,754,405 A | 6/1988 | Foster |
| 4,765,150 A | 8/1988 | Persem |
| 4,773,311 A | 9/1988 | Sharp |
| 4,794,537 A | 12/1988 | Adasek et al. |
| 4,795,088 A | 1/1989 | Kobayashi et al. |
| 4,800,804 A | 1/1989 | Symington |
| 4,803,848 A | 2/1989 | La Brecque |
| 4,806,833 A | 2/1989 | Young |
| 4,811,897 A | 3/1989 | Kobayashi et al. |
| 4,829,447 A | 5/1989 | Parker et al. |
| 4,842,190 A | 6/1989 | Orchard |
| 4,843,084 A | 6/1989 | Parker et al. |
| 4,859,921 A | 8/1989 | Archer |
| 4,860,231 A | 8/1989 | Ballard et al. |
| 4,868,467 A | 9/1989 | Davis |
| 4,879,502 A | 11/1989 | Endo et al. |
| 4,881,472 A | 11/1989 | Stromberger et al. |
| 4,883,982 A | 11/1989 | Forbes et al. |
| 4,886,110 A | 12/1989 | Jackson |
| 4,896,828 A | 1/1990 | Peitz, Jr. |
| 4,902,952 A | 2/1990 | Lavery |
| 4,903,685 A | 2/1990 | Melink |
| 4,909,041 A | 3/1990 | Jones |
| 4,931,948 A | 6/1990 | Parker et al. |
| 4,942,613 A | 7/1990 | Lynch |
| 4,950,918 A | 8/1990 | O'Breartuin et al. |
| 4,952,853 A | 8/1990 | Archer |
| 4,978,896 A | 12/1990 | Shah |
| 4,984,433 A | 1/1991 | Worthington |
| 4,992,715 A | 2/1991 | Nakamura et al. |
| 5,005,365 A | 4/1991 | Lynch |
| 5,006,744 A | 4/1991 | Archer et al. |
| 5,013,981 A | 5/1991 | Rodi |
| 5,019,757 A | 5/1991 | Beifus |
| 5,023,527 A | 6/1991 | Erdman et al. |
| 5,025,248 A | 6/1991 | Bergeron |
| 5,027,789 A | 7/1991 | Lynch |
| 5,043,926 A | 8/1991 | Naka et al. |
| 5,065,813 A | 11/1991 | Berkeley et al. |
| 5,074,780 A | 12/1991 | Erdman |
| 5,075,608 A | 12/1991 | Erdman et al. |
| 5,088,645 A | 2/1992 | Bell |
| 5,089,754 A | 2/1992 | George |
| 5,090,303 A | 2/1992 | Ahmed |
| 5,092,227 A | 3/1992 | Ahmed et al. |
| 5,104,037 A | 4/1992 | Karg et al. |
| 5,107,685 A | 4/1992 | Kobayashi |
| 5,115,728 A | 5/1992 | Ahmed et al. |
| 5,115,968 A * | 5/1992 | Grald ........................ 236/78 D |
| 5,117,656 A | 6/1992 | Keck et al. |
| 5,119,071 A | 6/1992 | Takezawa et al. |
| 5,125,067 A | 6/1992 | Erdman |
| 5,135,045 A | 8/1992 | Moon |
| 5,146,147 A | 9/1992 | Wills et al. |
| 5,159,218 A | 10/1992 | Murry et al. |
| 5,161,606 A | 11/1992 | Berkeley et al. |
| 5,170,344 A | 12/1992 | Berton et al. |
| 5,179,524 A | 1/1993 | Parker et al. |
| 5,192,020 A * | 3/1993 | Shah ........................ 236/46 R |
| 5,197,667 A | 3/1993 | Bowsky et al. |
| 5,202,951 A | 4/1993 | Doyle |
| 5,203,179 A | 4/1993 | Powell |
| 5,211,331 A | 5/1993 | Seel |
| 5,211,332 A | 5/1993 | Adams |
| 5,227,704 A | 7/1993 | Erdman |
| 5,237,826 A | 8/1993 | Baldwin et al. |
| 5,244,146 A | 9/1993 | Jefferson et al. |
| 5,250,867 A | 10/1993 | Gizaw |
| 5,270,952 A * | 12/1993 | Adams et al. ................ 700/278 |
| 5,276,630 A | 1/1994 | Baldwin et al. |
| 5,299,432 A | 4/1994 | Nakae et al. |
| 5,327,036 A | 7/1994 | Carey |
| 5,331,619 A | 7/1994 | Barnum et al. |
| 5,364,026 A | 11/1994 | Kundert |
| 5,376,866 A | 12/1994 | Erdman |
| 5,390,206 A | 2/1995 | Rein et al. |
| 5,390,277 A * | 2/1995 | Van Wagner et al. ......... 392/485 |
| 5,397,970 A | 3/1995 | Rowlette et al. |
| 5,410,230 A | 4/1995 | Bessler et al. |
| 5,418,438 A | 5/1995 | Hollenbeck |
| 5,440,218 A | 8/1995 | Oldenkamp |
| RE35,124 E | 12/1995 | Erdman et al. |
| 5,492,273 A | 2/1996 | Shah |
| 5,497,039 A | 3/1996 | Blaettner et al. |
| 5,513,058 A | 4/1996 | Hollenbeck |
| 5,544,036 A | 8/1996 | Brown, Jr. et al. |
| 5,557,182 A | 9/1996 | Hollenbeck et al. |
| 5,559,407 A | 9/1996 | Dudley et al. |
| 5,592,058 A | 1/1997 | Archer et al. |
| 5,592,059 A | 1/1997 | Archer |
| 5,607,014 A | 3/1997 | Van Ostrand et al. |
| 5,634,347 A * | 6/1997 | Hanson et al. ................ 62/120 |
| 5,736,823 A | 4/1998 | Nordby et al. |
| 5,777,409 A | 7/1998 | Keck |
| 5,796,194 A | 8/1998 | Archer et al. |
| 5,806,440 A | 9/1998 | Rowlette et al. |
| 5,825,107 A | 10/1998 | Johnson et al. |
| 5,859,519 A | 1/1999 | Archer |
| 5,893,705 A | 4/1999 | Khan et al. |
| 5,986,419 A | 11/1999 | Archer et al. |
| 5,994,869 A | 11/1999 | Becerra |
| 6,104,113 A | 8/2000 | Beifus |
| 6,132,182 A | 10/2000 | Khan et al. |
| 6,147,465 A | 11/2000 | Hollenbeck |
| 6,160,700 A | 12/2000 | Wise et al. |
| 6,191,398 B1 * | 2/2001 | Peake et al. ................ 219/497 |
| 6,215,261 B1 | 4/2001 | Becerra |
| 6,227,961 B1 | 5/2001 | Moore et al. |
| 6,353,299 B1 | 3/2002 | Ramachandran et al. |
| 6,356,044 B1 | 3/2002 | Archer |
| RE37,630 E * | 4/2002 | Behr ............................ 62/80 |
| 6,408,502 B1 | 6/2002 | Brahmavar et al. |
| 6,423,118 B1 | 7/2002 | Becerra et al. |
| 6,456,023 B1 | 9/2002 | Becerra et al. |
| 6,494,681 B2 | 12/2002 | Barry et al. |
| 6,504,338 B1 | 1/2003 | Eichorn |
| 6,522,954 B1 * | 2/2003 | Kummerer et al. .......... 700/278 |
| 6,664,681 B1 | 12/2003 | Ashe, Jr. et al. |
| 6,715,690 B2 * | 4/2004 | Hull et al. ................. 236/49.3 |

| | | | | | |
|---|---|---|---|---|---|
| 6,879,070 B2 | 4/2005 | Leany et al. | EP | 0198248 | 10/1986 |
| 6,895,176 B2 | 5/2005 | Archer et al. | EP | 0264728 | 4/1988 |
| 6,964,174 B2 | 11/2005 | Shah | EP | 0296699 | 12/1988 |
| 6,981,383 B2 | 1/2006 | Shah et al. | GB | 2202063 | 9/1988 |
| 6,993,414 B2 | 1/2006 | Shah | JP | 53-067921 | 6/1978 |
| 7,017,827 B2 | 3/2006 | Shah et al. | JP | 56-060904 | 5/1981 |
| 7,039,300 B2 | 5/2006 | Shah et al. | JP | 63-172302 | 7/1988 |
| 7,077,708 B1 | 7/2006 | Johnson et al. | JP | 63-220303 | 9/1988 |
| 7,106,019 B2 | 9/2006 | Becerra et al. | JP | 63-220304 | 9/1988 |
| 7,145,302 B2 | 12/2006 | Sanglikar et al. | JP | 1-023924 | 1/1989 |
| 7,161,316 B2 | 1/2007 | Archer et al. | JP | 1-133102 | 5/1989 |
| 7,180,215 B2 | 2/2007 | Archer et al. | JP | 64-005397 | 10/1989 |
| 7,212,887 B2 | 5/2007 | Shah et al. | JP | 3-049582 | 3/1991 |
| 7,234,324 B2* | 6/2007 | Gistau-Baguer ............ 62/657 | JP | 05-118630 | 5/1993 |
| 7,509,816 B2* | 3/2009 | Ootori et al. ............... 62/176.3 | JP | 07-327397 | 12/1995 |
| 2002/0143426 A1* | 10/2002 | Starner ...................... 700/207 | JP | 2002-098088 | 4/2002 |
| 2002/0152298 A1* | 10/2002 | Kikta et al. ................. 709/223 | JP | 2004-177063 | 6/2004 |
| 2003/0078677 A1* | 4/2003 | Hull et al. ...................... 700/1 | KR | 10-1986-003879 | 2/1987 |
| 2003/0216837 A1* | 11/2003 | Reich et al. ................. 700/276 | KR | 10-1987-015301 | 8/1989 |
| 2005/0051637 A1* | 3/2005 | Hansen ...................... 236/1 C | KR | 10-1992-001878 | 2/1995 |
| 2005/0155369 A1* | 7/2005 | Ootori et al. ............... 62/228.1 | WO | 85/00064 | 1/1985 |
| 2005/0280384 A1 | 12/2005 | Sulfstede | | | |
| 2006/0026978 A1* | 2/2006 | Craft, Jr. .................... 62/176.6 | | | |

FOREIGN PATENT DOCUMENTS

EP        0086650        8/1983

* cited by examiner

TEMPERATURE CONTROL IN VARIABLE-CAPACITY HVAC SYSTEM

FIELD OF INVENTION

This invention relates to systems and methods for controlling temperature, heating, ventilating, and air-conditioning (HVAC) equipment, systems and methods, and control equipment. Specific embodiments relate to mass-produced air conditioning units, for example, for residential applications, and to their controls.

BACKGROUND OF THE INVENTION

Heating, ventilating, and air-conditioning (HVAC) systems have been used to ventilate and maintain desirable temperatures within spaces such as buildings, for occupants to live and work, for example. Air conditioning units have been known to reduce the temperature of the air, and various types of heating systems have been used to increase the temperature of the air, including heat pumps, furnaces, electric resistance heat strips, and the like. Many units have been mass-produced and sold, that have provided air conditioning, heating, or both. Systems or units that provide ventilation (i.e., move air) and heat or cool the air (or both) are referred to herein as HVAC systems or units.

Traditional HVAC systems or units used in residential applications cycle on and off. For example, an air conditioning unit (or a unit that both heats and cools that is operating in a cooling mode) may turn on when the temperature in the space reaches a temperature one degree (e.g., Fahrenheit (F) or Celsius or Centigrade (C)) above the thermostat set point temperature, and may turn off when the temperature in the space reaches a temperature one degree below the thermostat set point temperature. Such systems or units keep the temperature within the space close to the set point temperature; however, temperature constantly varies from the top to the bottom of the range or deadband (e.g., from one degree above the temperature set point to one degree below the temperature set point in the above example). In addition, the unit is constantly cycling on and off, and it operates at full capacity and fan speed when it is on. So the occupants of the space are subjected to changes in noise when the unit cycles on and off, and when the unit is on, the noise is at a maximum level. In addition, certain wear occurs at a greater rate due to the cycling on and off of the equipment.

In addition, certain HVAC units have been used that have had variable speed fans or blowers, variable capacity heating or cooling (e.g., variable-speed air conditioning compressors), or both. Some such systems have been used in variable air volume (VAV) systems, for example, and have used variable speed drive units, such as variable frequency AC drive units or variable voltage DC drives. Some such systems have utilized a proportional band control, wherein the capacity of the HVAC system changes as the temperature in the space changes over a range of temperatures and capacitances. The range has been selected in such systems, such that the temperature set point is within the range, at the middle of the range. Further, for example, in an air conditioning mode, the unit may operate at its maximum capacity if the temperature within the space is at or above the top end (maximum temperature) of the temperature range. And the unit may operate at its minimum capacity if the temperature within the space is at or below the bottom end (minimum temperature) of the temperature range.

In such a system, the unit may operate continuously, and the capacity and fan speed changes only when the temperature in the space changes. In addition, except at the maximum end of the temperature range, the unit operates at less than full capacity and less than full blower speed. This reduces the amount of noise under most conditions, and avoids the rapid changes in temperature and noise of units and systems that cycle. Avoiding cycling and operating most of the time at less than maximum capacity has also reduced certain causes of wear.

However, in traditional proportional control systems, under most conditions, the resulting temperature in the space differs from the set point temperature. This is the case unless the capacitance that is needed to maintain a steady temperature also happens to be the capacitance called for at the set point temperature. Consequently, the temperature within the space gradually changes according to the need for heating or cooling, for example, as outside temperatures or solar gain changes. Thus, needs or potential for benefit exist for systems, equipment, and methods that provide for gradual changes in heating or cooling capacity while approaching the set point temperature. Further, needs or potential for benefit exist for such equipment, systems, and methods that are inexpensive, utilize existing components (e.g., to a greater degree than alternatives), are reliable, are easy to place into service by typical installation personnel, or a combination thereof. Needs or potential for benefit exist for such equipment, systems, and methods in typical residential applications, for example, such as mass-produced residential air-conditioning units, heat pumps, furnaces, and the like, that are suitable to be installed by typical installers of such equipment.

In addition, in the prior art, proportional band ranges were usually selected so that the set point was in the middle of the range. However, the typical operating capacity of the system usually differed from this midpoint of the range. Therefore, needs and potential for benefit further exist for systems, apparatuses, and methods wherein the temperature set point is closer to one end of the range than to the other end. Potential for improvement exists in these and other areas that may be apparent to a person of skill in the art having studied this document.

SUMMARY OF PARTICULAR EMBODIMENTS OF THE INVENTION

This invention provides, among other things, air conditioning units and systems that cool spaces within enclosures, heating systems and units, apparatuses for maintaining substantially constant temperatures within a space or an enclosure, methods of maintaining a substantially constant temperature within a space or an enclosure, HVAC units and systems, and controls for variable-capacity temperature changing systems. Different embodiments automatically gradually change capacity so that the temperature asymptotically approaches an input temperature set point, utilize a proportional band, utilize a floating temperature set point, automatically adjust a temperature range to bring the actual temperature closer to the input temperature set point, adjust or vary speed or torque of a compressor or fan motor using automated processes, or a combination thereof, for example. In addition, some embodiments utilize a temperature and capacity range wherein the set point is within the range and is closer to one end of the range than to the other end.

Various embodiments of the invention provide as an object or benefit that they partially or fully address one or more of the needs, potential areas for improvement or benefit, or functions described herein, for instance. Specific embodiments provide as an object or benefit, for instance, that they provide for a particular level of control of temperature within a space, provide for control of HVAC equipment or systems, or provide specific air conditioning systems, equipment, or units, or a combination thereof, for example. In many embodiments, a controller is used to control various equipment, and such a controller may be a digital controller, for example. In some embodiments, an object or benefit is to control temperature using systems, equipment, and methods that provide for gradual changes in heating or cooling capacity while approaching the set point temperature, that use asymmetrical ranges, or both.

Various embodiments provide equipment, systems, and methods that are reasonably inexpensive, utilize existing components to a significant degree, are reasonably reliable, and can reasonably be placed into service by typical installation personnel, for example, typical service personnel in residential installations. Further still, particular embodiments provide equipment, systems, and methods that control or maintain (at least to some extent) temperature within desired ranges or toward desired goals. Different embodiments may provide for reduced energy consumption in comparison with certain alternatives, may provide for reduced noise, may avoid insufficient or excessive airflow rates, may reduce certain causes of wear, or a combination thereof, as further examples.

In specific embodiments, this invention provides, for example, apparatuses for maintaining a substantially constant temperature within a space within an enclosure. In such embodiments, the apparatuses each include a variable-capacity temperature changing system for changing the temperature within the space by adding heat to, or removing heat from, the space, (or both), a temperature sensor positioned and configured to sense a present temperature within the space (or air drawn from the space), and an input device configured to receive an input temperature set point from an operator of the temperature changing system. These embodiments also include a controller that is in communication with the input device and in control of the variable-capacity temperature changing system, and the controller is configured to automatically continuously gradually change the capacity of the variable-capacity temperature changing system so that the temperature within the space asymptotically approaches the input temperature set point.

In many of these embodiments, the controller includes a first control means for changing the capacity of the variable-capacity temperature changing system over a range of present temperatures within the space, and the first control means provides a maximum capacity at a first end of the range, a minimum capacity at a second end of the range, and at least two gradually differing intermediate capacities between the ends of the range. Such embodiments also include a second control means for automatically moving the range, and the second control means moves the range less frequently than the first control means changes the capacity. In some such embodiments, the second control means moves the range based on a difference between the present temperature and the input temperature set point, for example.

In a number of embodiments, the controller includes a digital processor and the variable-capacity temperature changing system for changing the temperature within the space includes a compressor configured to compress a refrigerant, a condenser configured to cool and condense the refrigerant after the refrigerant is compressed by the compressor, and an expansion device having an inlet and an outlet and configured to pass the refrigerant from the inlet to the outlet while maintaining a substantially higher pressure at the inlet than at the outlet. Many such embodiments also include an evaporator coil positioned and configured to receive the refrigerant from the expansion device and to cool supply air to be delivered to the space, a first fan positioned and configured to move the supply air through the evaporator coil and to the space, and a second fan positioned and configured to move outside air through the condenser. Further, many of these embodiments also include a first electrical motor connected to and configured to turn the first fan, a second electrical motor connected to and configured to turn the second fan, a third electrical motor connected to and configured to turn the compressor, and at least one variable-speed drive unit configured and electrically connected to drive at least the third electrical motor at at least three different speeds.

Still other embodiments of the invention include, as another example, particular direct expansion air conditioning units for cooling a space within an enclosure and maintaining a substantially constant temperature within the enclosure. Such air conditioning units include a compressor configured to compress a refrigerant, a condenser configured to cool and condense the refrigerant after the refrigerant is compressed by the compressor, and an expansion device having an inlet and an outlet and configured to pass the refrigerant from the inlet to the outlet while maintaining a substantially higher pressure at the inlet than at the outlet. These units also include an evaporator coil positioned and configured to receive the refrigerant from the expansion device and to cool supply air to be delivered to the space, a first fan positioned and configured to move the supply air through the evaporator coil and to the space, a second fan positioned and configured to move outside air through the condenser, a first electrical motor connected to and configured to turn the first fan, a second electrical motor connected to and configured to turn the second fan, and a third electrical motor connected to and configured to turn the compressor.

Such embodiments also include at least one variable-speed drive unit configured and electrically connected to drive at least the third electrical motor at at least three different speeds, a temperature sensor positioned and configured to sense a present temperature within at least one of the space and return air drawn from the space, and an input device configured to receive an input temperature set point from an operator of the air conditioning unit. Further, these embodiments also include a controller that is in communication with the input device and the variable-speed drive unit. In these embodiments, the controller is configured to control the speed of the third electrical motor, and to cause the variable-speed drive unit to increase the speed of the third electrical motor as the present temperature increases, and to cause the variable-speed drive unit to decrease the speed of at least the third electrical motor as the present temperature decreases. Further, in these embodiments, the controller selects a present speed of the third electrical motor using a floating temperature set point, and changes the floating temperature set point based on whether the present temperature is above or below the input temperature set point.

In some such embodiments, the controller is configured to increase the floating temperature set point if the present temperature is below the input temperature set point, the controller is configured to decrease the floating temperature set point if the present temperature is above the input temperature set point, and the controller is configured to change the floating temperature set point at regular intervals of time, as examples. Further, in a number of embodiments, the controller is configured to change the floating temperature set point by a predetermined percentage of a difference between the input temperature set point and the present temperature, as another example. Moreover, in certain embodiments, the first electrical motor, the second electrical motor, or both, is a variable-speed motor, the speed of the (first or second) electrical motor increases as the present temperature increases, and the speed of the electrical motor decreases as the present temperature decreases, as yet another example.

In particular such embodiments, for example, there is a single enclosure for the air conditioning unit, and the compressor, the condenser coil, the expansion device, the evaporator coil, the first fan, the second fan, the first electrical motor, the second electrical motor, the third electrical motor, and the at least one variable-speed drive unit are all located within the single enclosure. Further, in many such embodiments, the controller includes a digital processor, and the air conditioning unit is marketed for residential applications. Other embodiments of the invention are (or include), as another example, a building that includes at least one embodiment of the apparatus, air conditioning unit or system or method described herein, and the building forms the enclosure in many such embodiments.

Still other specific embodiments include various methods, such as methods of maintaining a substantially constant temperature within a space within an enclosure by controlling a variable-capacity temperature changing system to change the temperature within the space by adding heat to, or removing heat from, the space (or both). For example, in some embodiments, these methods include at least the acts of inputting an input temperature set point, (i.e., using an automated process) measuring a present temperature within the space, and (i.e., using an automated process and using at least the present temperature within the space), varying the capacity of the variable-capacity temperature changing system over at least part of a capacity range. In these embodiments, the capacity range may extend from a minimum capacity, through at least two intermediate capacities, to a maximum capacity. Also in these embodiments, the capacity range corresponds to a temperature range, and the temperature range extends from a first end temperature, through at least two intermediate temperatures, to a second end temperature.

In such embodiments, the first end temperature corresponds to the minimum capacity, the second end temperature corresponds to the maximum capacity, and the input temperature set point is in between the first end temperature and the second end temperature of the temperature range. Such methods also include the act of (i.e., using an automated process) repeating multiple times the varying of the capacity of the variable-capacity temperature changing system over the capacity range, and the act of (i.e., using an automated process and using at least the present temperature within the space and the input temperature set point) adjusting the temperature range to bring the present temperature closer to the input temperature set point. In this particular activity, the adjusting of the temperature range includes changing the temperature at which a particular capacity corresponds, for at least two of the capacities within the capacity range.

Some of these embodiments also include, for example, an act of (e.g., using an automated process), repeating multiple times the adjusting of the temperature range to bring the present temperature closer to the input temperature set point. Further, in some embodiments, in the varying of the capacity of the variable-capacity temperature changing system over a capacity range, the temperature range consists of at least four discrete capacity increments, the temperature range consists of at least four discrete temperature increments, each of the temperature increments has a corresponding capacity increment, each of the capacity increments has a corresponding temperature increment, and from the minimum capacity to the maximum capacity, each capacity increment has a higher capacity than the previous capacity increment.

Even further, in certain embodiments, in the adjusting of the temperature range to bring the present temperature closer to the input temperature set point, the adjusting includes moving the temperature range by a percentage of a difference between the present temperature within the space and the input temperature set point, and the percentage is greater than zero percent and less than 100 percent, for example. In fact, in particular embodiments, as another example, in the adjusting of the temperature range to bring the present temperature closer to the input temperature set point, the percentage is greater than two percent and less than 50 percent. In some embodiments, as yet another example, in the adjusting of the temperature range to bring the present temperature closer to the input temperature set point, the adjusting is performed at substantially regular intervals of time, and the intervals of time are greater than one second and less than one hour.

Many of these embodiments also include obtaining or providing (or both) an air conditioning unit. In such embodiments, the air conditioning unit is the variable-capacity temperature changing system mentioned above, for example, and the air conditioning unit has a variable-speed compressor. In these embodiments, the varying of the capacity of the variable-capacity temperature changing system over a capacity range includes varying the speed of the compressor.

Other specific embodiments of the invention, for example, provide various methods of maintaining a substantially constant temperature within a space using a variable-capacity HVAC unit. Such methods may include the acts of inputting an input temperature set point, (i.e., using an automated process) measuring a present temperature within the space, and (i.e., using an automated process, and using the present temperature within the space) determining a present capacity at which to operate the HVAC unit such that the present capacity changes relative to an offset of the present temperature within the space from a floating temperature set point. These methods may also include (e.g., using an automated process) operating the HVAC unit at the present capacity, repeating multiple times the measuring of the present temperature, the determining of the present capacity, and the operating at the present capacity, changing the floating set point based on the input temperature set point and the present temperature within the space, and repeating multiple times the measuring of the present temperature, the determining of the present capacity, the operating at the present capacity, the repeating of the measuring, the determining, and the operating, and the changing of the floating temperature set point.

In many such methods, the changing of the floating temperature set point is performed at regular intervals of time, for example, and in some embodiments, the changing of the floating temperature set point includes changing the floating temperature set point by a predetermined percentage of a difference between the input temperature set point and the present temperature. In certain embodiments, for instance, the HVAC unit includes a variable-speed compressor, and the operating of the HVAC unit at the present capacity includes controlling the speed of the compressor. In various embodiments, the determining of the present capacity, in such embodiments, includes selecting a lower speed of the compressor as the present temperature decreases and selecting a higher speed of the compressor as the present temperature increases, for example. Further, in some embodiments, the HVAC unit includes an evaporator coil and a first fan configured and positioned to move air through the evaporator coil and to the space. In some such embodiments, the operating of the HVAC unit at the present capacity includes controlling the speed of the first fan, and the determining of the present capacity includes selecting a lower speed of the first fan as the present temperature decreases and selecting a higher speed of the first fan as the present temperature increases, for example.

The invention also provides a number of methods of controlling a variable-capacity temperature changing system, as another example. These methods include (i.e., using an automated process) at least the acts of inputting an input temperature set point, measuring a present temperature within the space, and (e.g., using at least the present temperature within the space) varying the capacity of the variable-capacity temperature changing system over at least part of a capacity range, for example. In such embodiments, the capacity range extends in capacity increments from a minimum capacity, through at least two intermediate capacities, to a maximum capacity, and the capacity range corresponds to a temperature range that extends in at least four temperature increments from a first end temperature, through at least two intermediate temperatures, to a second end temperature, for instance. In such embodiments, the first end temperature corresponds to the minimum capacity, for example, the second end temperature corresponds to the maximum capacity, the input temperature set point is in between the first end temperature curve and the second end temperature of the temperature range, and the input temperature set point is closer to one end of the temperature range than to the other end of the temperature range. These embodiments also include (e.g., using an automated process), repeating multiple times the varying of the capacity of the variable-capacity temperature changing system over the capacity range.

Some such embodiments also include (e.g., using an automated process, and using at least the present temperature within the space and the input temperature set point), adjusting the temperature range to bring the present temperature closer to the input temperature set point, for example. In some such embodiments, the adjusting of the temperature range includes changing the temperature at which a particular capacity increment corresponds, for at least two of the capacities within the capacity range, for instance. In some embodiments, for example, in the varying of the capacity of the variable-capacity temperature changing system over a capacity range, each of the temperature increments has a corresponding capacity increment, each of the capacity increments has a corresponding temperature increment, and the temperature increments and the capacity increments vary with a consistently positive slope from the minimum capacity to the maximum capacity and from the first end temperature to the second end temperature. Further, some embodiments include, for example, obtaining or providing (or both) an air conditioning unit that serves as the variable-capacity temperature changing system, and that has a variable-speed compressor. In some such embodiments, the varying of the capacity of the variable-capacity temperature changing system over a capacity range includes varying the speed of the compressor, for example.

The invention also provides other apparatuses, systems, methods, and software, for example, that are described herein.

Figure 1:
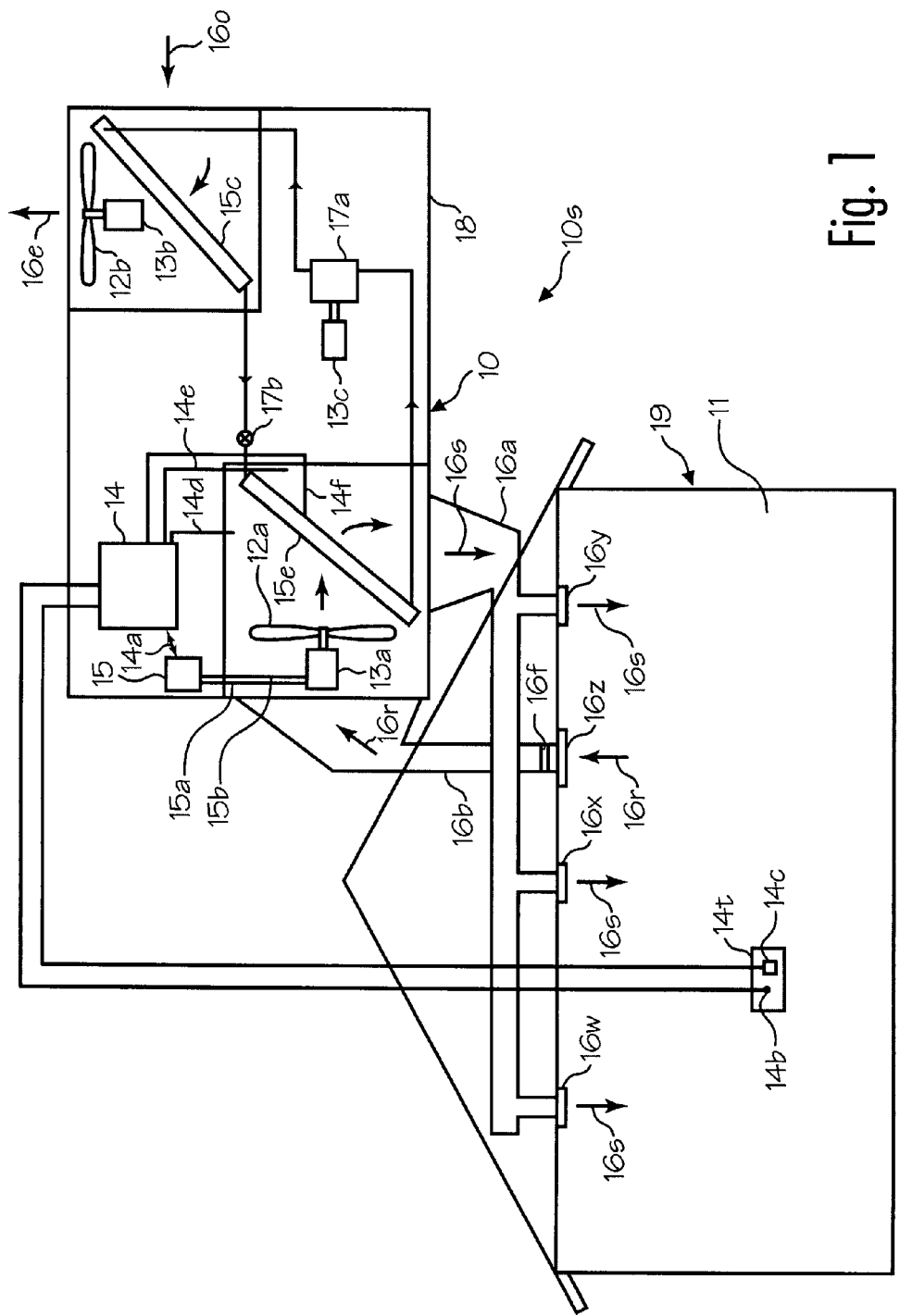
FIG. 1 is a block diagram illustrating, among other things, an air conditioning unit installed on a building, and various components thereof, that illustrates various examples of embodiments of the invention.

The drawings illustrate, among other things, various particular examples of embodiments of the invention, and certain examples of characteristics thereof. Different embodiments of the invention include various combinations of elements or activities shown in the drawings, described herein, known in the art, or a combination thereof.

DETAILED DESCRIPTION OF EXAMPLES OF EMBODIMENTS

In a number of embodiments, this invention provides improvements to heating, ventilating, and air-conditioning (HVAC) systems, temperature changing systems, direct-expansion air conditioning units, buildings having such equipment, and various methods, and controls. Particular improvements are found in software or control routines rather than in other physical structure. Various embodiments adjust or vary capacity, speed, or torque of one or more motors, fans, compressors, or other equipment, for example, to control temperature, for instance, to better achieve the desired set point temperature, to avoid sudden changes in capacity or speed, or both. Various embodiments at-least partially provide for control of temperature within a space, provide for control of HVAC equipment or systems, or provide specific air conditioning systems, equipment, or units, or a combination thereof, for example. Different processes may be automated, continuous, or both, in various embodiments. In many embodiments, a controller is used to control certain equipment, and such a controller may be a digital controller, for example. In some embodiments, air conditioning units may be mass produced in common configurations and installed in different buildings or structures, such as residences.

Embodiments of the invention may be in the form of HVAC units, controls for HVAC units, software used in controllers, methods of controlling HVAC units, buildings containing HVAC units, etc. Embodiments may be provided with new HVAC units, provided with controllers as replacement parts or retrofit parts, provided separately as software, provided as a service or upgrade, or implemented, for example, by HVAC maintenance personnel or building owners. Many of the method activities or acts may be implemented automatically, for example, by a controller or HVAC unit, but some acts of certain methods, such as obtaining or providing certain equipment, may be performed by personnel or businesses.

FIG. 1 illustrates an example of both embodiments of the invention and an environment in which particular embodiments of the invention may be used. In this embodiment, air-handling unit or air conditioning unit 10 is used for ventilating an at-least partially enclosed space 11. In addition, in this embodiment, space 11 is enclosed (i.e., at least partially) by or within building or structure 19, which may be a residence such as a single family house, an apartment, a portion of a duplex, triplex, or fourplex, or a cabin, or may be a hotel room, a business establishment such as a store or a restaurant, or the like. Building 19 is an example of particular embodiments of the invention that are (or include) a building (e.g., 19) that includes at least one embodiment of the air conditioning unit (e.g., 10), system (e.g., 10s) or a method described herein. The building 19 forms an enclosure (e.g., for space 11) in the embodiment illustrated, and air-handling or air conditioning unit 10, ductwork 16a and 16b, registers 16w, 16x, and 16y, filter 16f, grille 16z, and thermostat 16t, form ventilation system 10s. In many embodiments, residential use is the predominant market for air handling unit 10, for instance.

Air handling or air conditioning unit 10 is an example of a space-conditioning appliance, and an example of an apparatus for maintaining a substantially constant temperature within space 11, within enclosure 19. Air handling or air conditioning unit 10 is also an example of a direct expansion air conditioning unit for cooling space 11, within enclosure 19, and maintaining a substantially constant temperature within enclosure 19. Further, air handling or air conditioning unit 10 (or system 10s) is an example of a variable-capacity temperature changing system, which may be used, for example, to change temperature within space 11 by at least one of adding heat to and removing heat from space 11. Moreover, air handling or air conditioning unit 10 is an example of a variable-capacity HVAC unit. Other examples of such apparatuses, units, and systems may be apparent to a person of ordinary skill in the art having studied this document.

In the embodiment illustrated, air conditioning unit 10 includes a first fan 12a that is configured to move or blow air through air conditioning unit 10 and to space 11. In this embodiment, supply air 16s is delivered to space 11 through ductwork 16a and registers 16w, 16x, and 16y. Further, in this embodiment, return air 16r is fed to air conditioning unit 10 through return air ductwork 16b, filter 16f, and grille 16z, as may be found in a residential application, for example. In other embodiments, fan 12a may be fed with outside air, or a combination of outside and return air, for example. As would be apparent to a person of ordinary skill in the art, air handling unit 10 and structure 19 are not shown to scale relative to each other in FIG. 1, and other components illustrated may also not be shown to scale. Fan 12a, in different embodiments, may be an axial or propeller-type fan (as shown), a centrifugal fan [e.g., with forward curved (e.g., a squirrel cage fan) or backward curved vanes (e.g., airfoil shaped)], or a mixed flow fan, as examples.

In this embodiment, within air conditioning unit 10, electric first motor 13a is connected to and configured to turn first fan 12a. As used herein, "connected to and configured to turn" includes through a common rotating shaft (as illustrated), directly coupled, through a belt drive (e.g., which may have an adjustable sheave or pulley), or integral (e.g., an integral fan and motor), for example. In this example of an embodiment, motor 13a is driven or powered by drive unit 15 through leads 15a and 15b. Drive unit 15 may be an electronic control module, for example. In some embodiments, motor 13a is an alternating current (AC) motor, and drive unit 15 is a variable frequency drive unit, for example. In such embodiments, motor 13a may be a two-phase motor and may have two leads 15a and 15b (as shown) or may have three or more phases and a corresponding number of leads, in other embodiments, as other examples. In AC embodiments, drive unit 15 may be configured to produce a varying frequency AC power supply to motor 13a through leads 15a and 15b to control the speed of motor 13a and fan 12a, for instance.

In other embodiments, motor 13a may be a direct current (DC) motor and drive unit 15 may be a DC power supply, which may be configured to produce a varying DC output voltage to motor 13a through leads 15a and 15b to control the torque to, and therefore the speed of, motor 13a and fan 12a, for example. In still other embodiments, drive unit 15 may be a variable frequency AC power supply, but may provide for control of torque. In still other embodiments, drive unit 15 may be a DC power supply, but may provide for control of speed. As used herein, all such embodiments of drive unit 15 are examples of variable-speed drive units, which may be, for example, configured and electrically connected to drive at least the third electrical motor 13c at, for example, at least three different speeds. In addition, or instead, drive 15, or another drive that may be similar, may control the speeds of other motors, such as motor 13b, motor 13c, or both. Further, although shown in FIG. 1 as a separate components, in some embodiments, drive unit 15 may be integral with a motor, such as motor 13a or motor 13c, as examples.

Still referring to FIG. 1, drive unit 15, and thereby motor 13a and fan 12a, motor 13c and compressor 17a, motor 13b and fan 12, or a combination thereof, in some embodiments, may be controlled by control system or controller 14. In this embodiment, drive unit 15 and controller 14 are shown as separate devices; however, in other embodiments, drive unit 15 and controller 14 may be integral, controller 14 may be part of drive unit 15, or drive unit 15 may be part of controller 14, as examples. Controller 14 may include, or consist of, in some embodiments, an electronic board dedicated for this purpose or combined with one or more other electronic boards such as a furnace, air handler, or thermostat board, as examples. In this embodiment, controller 14 is shown to be within enclosure 18 of air conditioning unit 10, but in other embodiments, controller 14 may be located elsewhere, for example, within structure 19, or within space 11. And in some embodiments, controller 14 may be combined with or integral to a thermostat (e.g., thermostat 14t) or user-accessible control panel, for example. Further, in some embodiments, controller 14 may be digital, and may include a digital processor, software, storage, memory, etc.

Still further, in some embodiments, an input device or user interface 14c may be provided which may include a keypad, a display, or the like. Such a user interface (e.g., 14c) may be part of controller 14, part of thermostat 14t, or may be a separate component, in various embodiments. Input device or user interface 14c may be configured to receive an input temperature set point from an operator of the (e.g., air conditioning) unit (e.g., 10), for example, entered or keyed in as a digital number, by turning a dial, or with a slide switch, as examples. Further, in many embodiments controller 14 is in communication with input device 14c, or thermostat 14t, as well as variable-speed drive unit 15.

In a number of embodiments, controller 14 may output instructions to drive unit 15. In some embodiments, controller 14 outputs instructions to other components of air conditioning unit 10 as well, or may have other outputs, in addition to those described herein. Output instructions from controller 14 to drive unit 15 may be transmitted through data link 14a, for instance, and may include, for example, input settings, which may include instructions for drive unit 15 to operate motor 13a at a particular speed or torque, for example. In some embodiments, controller 14 may instruct drive unit 15 to operate motor 13a at a particular AC frequency or at a particular DC voltage, as other examples. Data link 14a (or other data links) may include one or more conductors, which may communicate digital or analogue signals, for example. These conductors may be insulated, shielded or both. In other embodiments, data link 14a, or other data links (e.g., to thermostat 14t) may include a wireless connection, communication over power conductors, communication through a network, fiber-optic communication, or the like, as further examples.

In a number of embodiments, controller 14 may also input data, measurements, or instructions from sensors or other devices and may use such inputs to calculate, select, or determine output instructions, such as input settings for drive unit 15, for example, or speeds or torques for one or more motors (e.g., one or more of motors 13a to 13c). Examples of such sensors include temperature sensors, pressure sensors (which may measure absolute pressure, gauge pressure, differential pressure, or a combination thereof, flow meters, humidity sensors, frost formation sensors, etc. Sensors may convert parameters into an electrical signal, for example, an analogue (e.g., a voltage, current, resistance, capacitance, etc.) or digital signal, and such an electrical signal may be delivered, (e.g., through one or more conductors or data links) to controller 14.

In some embodiments, including the embodiment illustrated in FIG. 1, (e.g., air-handling unit) unit 10 is an air conditioning unit having evaporator 15e. Unit 10 may be a vapor compression cycle or direct expansion unit, for example. Evaporator 15e may be a heat-transfer coil configured and positioned so that the air (e.g., return air 16r) blown by first fan 12a through air-handling or air conditioning unit 10 passes through the heat-transfer coil (e.g., 15e) (e.g., becoming supply air 16s). In this example, wherein the heat-transfer coil is an evaporator (15e), a fluid (e.g., a refrigerant, such as Freon) passes through the heat-transfer coil (e.g., 15e), and heat is transferred via the heat-transfer coil (e.g., 15e) between the air and the fluid. Thus, in a number of embodiments, air-handling unit 10 is an air conditioning unit, the fluid (e.g., that passes through the heat-transfer coil) is a refrigerant, and the first heat-transfer coil is an evaporator coil or cooling coil (e.g., 15e). In some embodiments, coil 15e is a cooling coil when air conditioning unit 10 is operating in a cooling mode, but is a heating coil when air conditioning unit 10 is operating in a heating mode (e.g., as a heat pump).

In some other configurations, chilled water (e.g., cooled by a chiller) or (e.g., in a heating mode) heated water (e.g., heated with electric heat, by burning a fuel such as natural gas, propane, heating oil, wood, biomass, hydrogen, or coal, produced by solar energy, from a geothermal source, produced as waste heat from an industrial process, produced as heat from cogeneration, or produced as waste heat from chillers or air conditioning units), or steam (e.g., produced similarly or in a boiler) are other examples of fluids that may pass through the heat-transfer coil (e.g., 15e), or another coil. Such a coil containing chilled water is another example of a cooling coil. Another example of a coil (e.g., 15e) is an electric strip heater.

In the particular embodiment illustrated, air conditioning unit 10 further includes, within enclosure 18 for air conditioning unit 10, expansion device 17b, compressor 17a, an electric second motor 13c connected to and configured to turn compressor 17a, condenser coil 15c, second fan 12b configured to blow air (e.g., outside air 16o, which becomes exhaust air 16e) through condenser coil 15c, and electric third motor 13b connected to and configured to turn second fan 12b. In particular such embodiments, there is a single enclosure 18 for the air conditioning unit 10, and these components, at least one variable-speed drive unit 15, or a combination thereof, are all located within the single enclosure 18.

In various embodiments, expansion device 17b may have an inlet and an outlet and may be configured to pass the refrigerant, for example, from the inlet to the outlet while maintaining a substantially higher pressure at the inlet than at the outlet. In some embodiments, expansion device 17b is an expansion valve, for example, which may be configured to compensate for different pressures, temperatures, phases, degrees of superheat, etc. In some embodiments, a sensor is used to measure the pressure and temperature at the outlet of evaporator 15e. This pressure and temperature is used (e.g., by controller 14) to control the opening size or capacity, for example, of expansion device 17b, for instance, to maintain a minimum temperature differential above the boiling point, or a minimum amount of superheat, at the outlet of evaporator 15e. Some embodiments may use a tube, turbine, or the like, for, or as part of, expansion device 17b.

Air conditioning unit 10, in the configuration illustrated, is an example of a packaged air conditioning unit. In other embodiments, many similar components may be located in a separate enclosure. For example, in some embodiments, (e.g., split systems) components analogous to expansion valve or device 17b, compressor 17a, electric second motor 13c connected to and configured to turn compressor 17a, condenser coil 15c, second fan 12b configured to blow air (e.g., outside air 16o, which becomes exhaust air 16e) through condenser coil 15c, and electric third motor 13b connected to and configured to turn second fan 12b may be located in one or more enclosures outside of structure 19 (e.g., mounted on the ground). In such embodiments, components analogous to evaporator 15e, blower or fan 12a, and motor 13a, (or a number of sets of such components) may be located inside structure 19, for example.

In some embodiments, motor 13c may be a constant-speed motor, and compressor 17a may be operated at a constant speed. In such embodiments, compressor 17a may have a variable capacity (i.e., at a constant speed). In other embodiments, motor 13c and compressor 17a may have multiple speeds (e.g., 2, 3, 4, or 5 speeds). In some embodiments, motor 13c may be a variable-speed motor (e.g., driven by drive 15), and compressor 17a may be operated at variable speeds. In some such embodiments, compressor 17a may be operated at continuously varying speeds over a range of speeds, while in other embodiments, compressor 17a may just be operated at particular (e.g., discrete) speeds within a range (e.g., to avoid resonance frequencies). For example, in some embodiments, compressor 17a is operated at eleven (11) different speeds within a range from a minimum speed to a maximum speed. In other embodiments, other numbers of speeds may be used.

Further, in some situations, controller 14 may be used to control (e.g., the speed of) multiple motors, which may include one or more motor blower assemblies (e.g., motor 13a and fan 12a), compressor 17a driven by motor 13c, etc. In some applications, dip switches, jumpers, or both, may be mounted on the board, for example, to select the desired assembly. In certain embodiments, communication between the control circuit (e.g., of controller 14) and the motor (e.g., 13a or 13c) may be used to detect the assemblies.

Certain examples of embodiments of the invention include or provide mass-produced air conditioning units (e.g., air conditioning unit embodiments of air-handling unit 10) for a variety of residential structures (e.g., an example of which is structure 19). Such air conditioning units may include, among other things, evaporator 15e, fan 12a configured to blow air through the air conditioning unit (e.g., through unit 10, evaporator 15e, or both) to space 11, electric motor 13a connected to and configured to turn fan 12a, compressor 17a, motor 13c connected to and configured to turn compressor 17a, and control system 14 configured to use one or more inputs to control and vary the speed or the torque of one or both of motors 13a and 13c. In these embodiments, control system 14 may be configured to repeatedly or continuously (or both) sample one or more inputs (e.g., from one or more sensors, for example, sensor 14b) and vary the speed or the torque (or both, e.g., power) of motor 13c, motor 13a, motor 13b, or a combination thereof, for example, to control the cooling or heating capacity (e.g., from compressor 17a), airflow rate (e.g., of supply air 16s, return air 16r, or both) through evaporator 15e or through air conditioning unit 10, or the airflow rate of outside air 16o, exhaust air 16e, or both. Different inputs may be used in different embodiments, and various examples are described herein.

In specific embodiments, air conditioning unit 10 or system 10s may be used (possibly among other uses) for cooling space 11 within enclosure 19, for example. Such an air conditioning unit 10 or system 10s includes, in this embodiment, evaporator or cooling coil 15e positioned within system 10s (e.g., within unit 10 or enclosure 18) and configured to cool air (e.g., cool return air 16r, which becomes supply air 16s) to be delivered from air conditioning system 10s to space 11, first fan 12a positioned and configured to move the air (e.g., return air 16r, which becomes supply air 16s) through cooling coil 15e and to space 11, first electrical motor 13a connected to and configured to turn first fan 12a, compressor 17a, electric motor 13c connected to and configured to turn compressor 17a, and a first variable-speed drive unit or system 15 configured and at least electrically connected to drive electrical motor 13a, electrical motor 13c, or both. In some such embodiments, drive unit or system 15 may also drive electrical motor 13b, which drives condenser fan 12b.

In specific embodiments, for example, apparatuses, which may include unit 10, for instance, provide for maintaining a substantially constant temperature within space 11, within enclosure 19, or both. In such embodiments, the apparatuses may each include, for example, a variable-capacity temperature changing system (e.g., unit 10, or system 10s) for changing the temperature within space 11 by either adding heat to space 11 or removing heat from space 11 (e.g., or both, depending on whether in a heating or cooling mode, such as with a heat pump). Specific embodiments include a temperature sensor positioned and configured to sense a present temperature within space 11 (e.g., sensor 14b located on or within thermostat 14t inside space 11) or air drawn from space 11 (e.g., sensor 14d within return air 16r). Some embodiments may include both such sensors (e.g., 14b and 14d). In many embodiments, thermostat 14t, for example, may be or include an input device (e.g., 14c) configured to receive an input temperature set point from an operator of the temperature changing system (e.g., unit 10 or system 10s). Such an input device (e.g., 14c) may include a sliding or rotating control switch, which may be continuously variable or have a discrete number of increments, as examples, or may have a digital input (e.g., a keypad). Some embodiments of thermostat 14t may include a display or screen (e.g., as part of input device or user interface 14c), which may display the set point, the present temperature (e.g., within space 11), etc.

These embodiments also include a controller, such as controller 14, that is in communication with the input device (e.g., user interface 14c or thermostat 14t) and in control of the variable-capacity temperature changing system (e.g., unit 10). As used herein such communication (e.g., between thermostat 14t and controller 14) exists if controller 14 receives the temperature set point from thermostat 14t. This communication may be accomplished, for example, through electrical wiring. In some such embodiments, controller 14 and thermostat 14t may be the same device (e.g., within space 11 or enclosure 18) or housed within a common enclosure. Further, as used herein, controller 14 is in control of the variable-capacity temperature changing system (e.g., unit 10) if controller 14 controls the speed of compressor 17a, for example, by controlling the speed or torque of motor 13c, for example, or if controller 14 otherwise controls the amount of heat that is added to or removed from space 11 or return air 16r and supply air 16s. In some embodiments, controller 14 may also control motor 13a, motor 13b, or both.

Further, in some embodiments, the controller 14 is configured to automatically, continuously, and gradually change the capacity of the variable-capacity temperature changing system (e.g., unit 10) so that the temperature within space 11 asymptotically approaches the input temperature set point. As used herein, asymptotically approaching the input temperature set point excludes prior art units that cycle on and off. Such units do not gradually change the capacity, but only change the capacity from maximum to off, and vice versa. In addition, such units do not approach the input temperature set point asymptotically, but rather approach the set point quickly, typically going past it until the unit shuts off. The temperature then typically angles back through the set point to the other side of the deadband, where the unit turns back on. Such a process results in a zigzag pattern of temperature across the deadband that does not asymptotically approach the set point.

Also, as used herein, traditional proportional controls do not asymptotically approach the input temperature set point, at least not continuously. In traditional proportional control systems, under most conditions, the resulting temperature in the space differs from the set point temperature. The control system does not compensate for this, at least not continuously, in an effort to reach the set point temperature. As used herein, systems that are "configured to automatically continuously gradually change the capacity of the variable-capacity temperature changing system so that the temperature within the space asymptotically approaches the input temperature set point" include only systems that continuously change the capacity of the system to get closer to the set point temperature, without (due to the actions of the controls, rather than outside heating or cooling influences) going past the set point temperature.

Also, in this context, "continuously" includes systems that make frequent small discrete changes. In this definition, "frequent" means more often than ten (10) times per hour, on average, and "small" means less than ten (10) percent of the system capacity, on average. As used herein "gradually" includes either continuously varying, or varying in discrete increments, where there are more than two increments between minimum and maximum capacity of the system. Also as used herein, "capacity" means the rate at which heat is added to or removed from the space (e.g., space 11).

Figure 2:
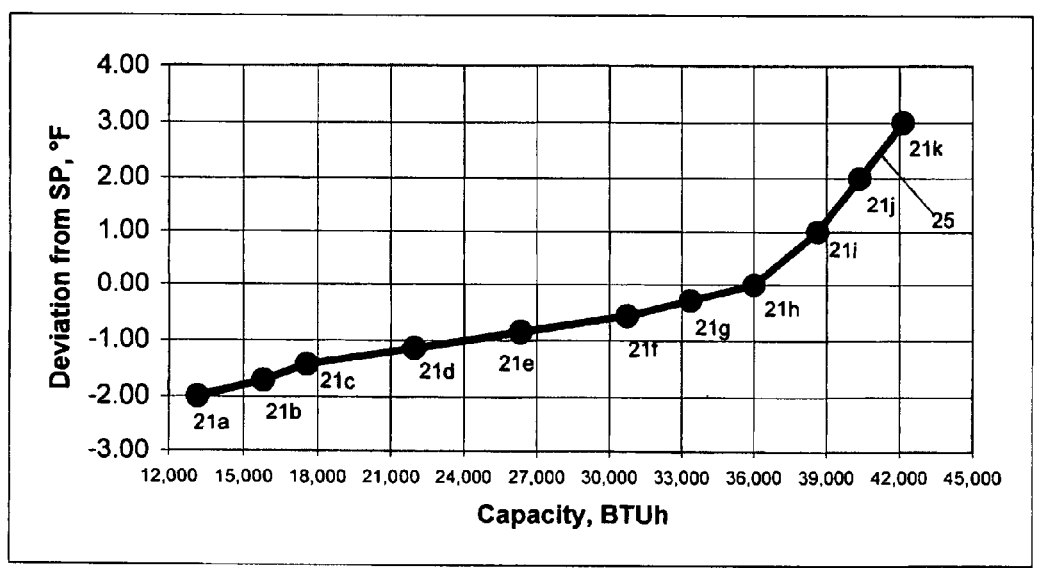
FIG. 2 is a graph illustrating an example of a curve and a range, as an illustration of certain data that may be used in various apparatuses, systems, and methods in accordance with the invention.

FIG. 2 is a graph illustrating a relationship between temperature and capacity in particular embodiments of the invention. In FIG. 2, temperature is illustrated as a deviation from a set point temperature (e.g., entered by a user at user interface 14c at thermostat 14t), and capacity is shown in BTUs per hour (BTUh). FIG. 2 illustrates data that may be embedded within controller 14, for example, but such data may not necessarily be illustrated in the form of a graph in some embodiments. In particular embodiments, such data (e.g., illustrated in FIG. 2) may be in the form of a table (e.g., a lookup table), for instance.

FIG. 2 illustrates an upward sloping graph, which corresponds to a cooling mode operation, for example, of an air conditioning unit (e.g., unit 10). A heating mode operation would have a downward sloping graph (e.g., unit 10 operating as a heat pump). As illustrated, the graph or curve 25 of FIG. 2 is not linear, but rather curves upward (is concave upward) at the right end. Other embodiments may have other shapes, such as linear, concave downward, concave upward at the right end and concave downward at the left end, etc. In some embodiments, curve 25 may be represented by a polynomial (e.g., by coefficients of a polynomial), for example. Some embodiments may be partly curved and partly linear. In some embodiments, the curve (e.g., continuous or made up of discrete increments) may have a positive slope from one end to the other (e.g., in a cooling mode) or may have a negative slope from one end to the other (e.g., in a heating mode).

In the embodiment illustrated, curve 25 extends over a temperature range from two (2) degrees F. below the set point temperature (e.g., −2.00 F), to three (3) degrees F. above the set point temperature, for a total temperature range of 5 degrees F. Other embodiments may have a temperature range of 2, 3, 4, 5, 6, 7, 8, 9, 10, 11, 12, 15, or 20 degrees F. or C., as examples. In addition, curve 25 extends over a capacity range from 13,179 BTUh to 42,144 BTUh, for a total capacity range from 31.3 percent to 100 percent of maximum (full) capacity. Other embodiments may have a capacity range from 0, 10, 20, 30, 40, 50, 60, or 70 percent to 100 percent of maximum (full) capacity, as examples.

In many embodiments, controller 14 includes a first control means for changing the capacity of the variable-capacity temperature changing system (e.g., unit 10 or system 10s) over a range of present temperatures within space 11. An example of such a range of present temperatures is illustrated in FIG. 2, extending from two (2) degrees F. below the set point at the bottom end 21a of the range to three (3) degrees F. above the set point at the top end 21k of the range, along curve 25. In some embodiments, the range may include (e.g., to the left and below point 21a) a step at a capacity of zero (0) BTUh (e.g., when the compressor, or other temperature changing system or apparatus, is turned off), which may correspond, for instance, to three (3) degrees F. below the set point. In some embodiments, the first control means provides a maximum capacity (e.g., 42,144 BTUh) at a first end (e.g., corresponding to step 21k) of the range (e.g., the range extending from 21a to 21k), a minimum capacity (e.g., 13,170 BTUh) at a second end (e.g., 21a) of the range, and at least two gradually differing intermediate capacities (e.g., corresponding to steps 21b to 21j) between the ends (e.g., between 21a and 21k) of the range.

Some embodiments also include a second control means for automatically moving the range (e.g., the range extending from 21a to 21k or curve 25), and the second control means may move the range less frequently than the first control means changes the capacity, for instance. The range (e.g., the range extending from 21a to 21k or curve 25) shown in FIG. 2, may be moved, for example, up or down. In some such embodiments, the second control means moves the range (e.g., 21a to 21k or curve 25) based on a difference between the present temperature and the input temperature set point for example.

As an example, in the embodiment illustrated FIG. 2, the unit or variable-capacity temperature changing system for changing the temperature within space 11 (e.g., unit 10 or system 10s) operates at step 21h (35,998 BTUh) if the present temperature (e.g., measured at temperature sensor 14b at thermostat 14t) is at the set point temperature (e.g., entered by a user into user interface 14c or thermostat 14t). However, if cooling loads are slight, for example, at night, or when it is not very hot outside (e.g., outside of building 19), the temperature within space 11 may drop at this cooling capacity. When this happens, the first control means may reduce the capacity of the unit or variable-capacity temperature changing system for changing the temperature within space 11 (e.g., unit 10 or system 10s).

Specifically, in this embodiment, when the temperature within space 11 reaches about 0.29 degrees F. below the set point, the capacity may reduce (i.e., at step 21g) to 33,364 BTUh, and when the temperature within space 11 reaches about 0.57 degrees F. below the set point, the capacity may reduce (i.e., at step 21f) to 30,730 BTUh. Similarly, in this embodiment, when the temperature within space 11 reaches about 0.86 degrees F. below the set point, the capacity may reduce (i.e., at step 21e) to 26,340 BTUh, and when the temperature within space 11 reaches about 1.14 degrees F. below the set point, the capacity may reduce (i.e., at step 21d) to 21,950 BTUh. Even further, in this embodiment, when the temperature within space 11 reaches about 1.43 degrees F. below the set point, the capacity may reduce (i.e., at step 21c) to 17,560 BTUh, and when the temperature within space 11 reaches about 1.71 degrees F. below the set point, the capacity may reduce (i.e., at step 21b) to 15,804 BTUh.

For purposes of this example, lets assume that the temperature within space 11 reaches steady state at step 21d (i.e., 1.71 degrees F. below the set point, at a capacity of 15,804 BTUh). If the cooling load were slightly higher, the system may oscillate (e.g., slowly) between steps 21d and 21e, as another example. Either scenario may maintains an adequately stable temperature; however, the temperature within space 11 is at least one degrees F. below the set point temperature. To compensate for this, in this embodiment, the second means may move the range upward (e.g., slowly or gradually), causing the capacity to reduce further (e.g., to step 21c, 21b, or even 21a).

In this example, a finite number of stepped or discrete capacities are used, specifically, 11 different capacities (corresponding to steps 21a to 21k). Other embodiments may use a different number of discrete capacities (e.g., 3, 4, 5, 6, 7, 8, 9, 10, 12, 13, 14, 15, 16, 18, 20, 25, 30, 35, 40, 50, 60, 75, 100, etc.) or may continuously vary the capacity (e.g., the speed of motor 13c), for instance, along all or one or more parts of curve 25. In different embodiments, a combination of discrete capacities and ranges of continuously variable capacitance may be used, or ranges of continuously variable capacity may be used with the exception of certain discrete capacities or ranges. In some embodiments, discrete capacities or speeds may be used to avoid resonance frequencies (e.g., noise, vibration, or both), which may be empirically determined through testing. In various embodiments, discrete capacities or speeds may be passed over or avoided to avoid resonance frequencies. In some embodiments, sensors may be provided to detect noise or resonance and speeds or capacities having elevated levels of noise or vibration may be avoided, for example, under the control of controller 14.

In certain embodiments wherein the temperature changing system is an air conditioning unit (e.g., unit 10), controller 14 is configured to control the speed of the third electrical motor (e.g., 13c), and to cause variable-speed drive unit 15 to increase the speed of the third electrical motor (e.g., 13c) as the present temperature (e.g., measured at thermostat 14t or sensor 14b) increases, and to cause variable-speed drive unit 15 to decrease the speed of at least the third electrical motor (e.g., 13c) as the present temperature decreases. Further, in some such embodiments, controller 14 selects a present speed of the third electrical motor (e.g., 13c) using a secondary or floating temperature set point, and changes the floating temperature set point based on whether the present temperature (e.g., measured at thermostat 14t or sensor 14b) is above or below the input temperature set point.

As an example, if the set point is 72 degrees F. (e.g., corresponding to step 21h in FIG. 2), the curve 25 shown in FIG. 2 may first be used with 72 degrees F. corresponding to step 21h (e.g., 0.00 degrees F. deviation). But if this results in a temperature that differs from the set point (i.e., is above or below 72 degrees F. in this example), then a different, secondary, or floating temperature set point may be used, for example, to correspond to step 21h or 0.00 degrees deviation. Such a floating temperature set point varies from the (e.g., user input) set point, for example, so that the actual temperature (e.g., within space 11) will approach (e.g., asymptotically) the (e.g., user input) set point.

For example, if it is particularly hot and sunny outside (e.g., in a cooling mode), and the unit (e.g., unit 10) represented by FIG. 2 must operate at more than the 35,998 BTUh capacity that corresponds to step 21h in order to keep space 11 at the set point of 72 degrees F., then a floating temperature set point of 70 degrees F. may be used, for instance, so that the unit (e.g., unit 10) operates at step 21j, at 40,388 BTUh at a temperature within space 11 (e.g., measured at sensor 14b at thermostat 14t) of 72 F. When the sun sets and the temperature outside (e.g., of building 19) cools off, the temperature within space 11 may cool to below 72 degrees F. When the temperature within space 11 reaches 71 degrees F., the unit (e.g., 10) may change capacities to step 21i (i.e., 38,632 BTUh) and the floating set point may float upward, for example, approaching 71 degrees F. If the temperature within space 11 continues to fall, then the capacity may further reduce, and the floating set point may continue to rise, for example, above the (e.g., user input) set point temperature. Thus, in some embodiments, controller 14 adjusts the set point of curve 25 behind the scenes to adjust or fine-tune the temperature within space 11, to result in a temperature within space 11 that is closer to the input temperature set point.

Accordingly, in some such embodiments, controller 14 is configured to increase the floating temperature set point if the present temperature (e.g., within space 11) is below the (e.g., user) input temperature set point, controller 14 is configured to decrease the floating temperature set point if the present temperature (e.g., within space 11) is above the input temperature set point. Further, in some embodiments, controller 14 is configured to change the floating temperature set point at regular intervals of time. Such a regular interval of time may be, for example, 60 seconds, in some embodiments. In other embodiments, the interval of time may be 10, 15, 30, 45, 50, 55, 65, 70, 75, 80, 90, 100, 110, 120, 130, 140, 150, 160, 180, 200, 220, 230, 240, 250, 270, 300, 330, 360, 420, or 480 seconds, as examples.

In other embodiments, the interval of time may not be regular, but rather, may depend upon circumstances, or may be randomly selected, in some embodiments. In certain embodiments, for example, the interval of time may be shorter if the capacity is higher (e.g., unit 10 is operating on the right end of curve 25), if the floating temperature set point is farther from the input temperature set point, or if the temperature within space 11 is (or has remained) farther from the input temperature set point.

Further, in a number of embodiments, controller 14 is configured to change the floating temperature set point by a (e.g., predetermined) fraction or percentage of a difference between the input temperature set point (e.g., input by a user at user interface 14c or thermostat 14t) and the present temperature (e.g., within space 11). As used herein, such a percentage is more than zero (0) percent, but less than one hundred (100) percent. Such a percentage may be selected, for example, so that the temperature asymptotically approaches the input temperature set point. Some embodiments may have overshoot in the first cycle, but do not oscillate. Still other embodiments may oscillate, but do not hunt, and may dampen after a few cycles, for example.

In some embodiments, the percentage may be, for example, ten (10) percent of the difference between the set point (e.g., the input temperature set point) and the present temperature (e.g., within space 11). Other embodiments may use such a percentage that is between 2 percent and 70 percent, between 5 percent and 35 percent, or between 7 percent and 20 percent, as examples. Other embodiments may use such a percentage that is 1, 2, 3, 4, 5, 6, 7, 8, 9, 11, 12, 13, 14, 15, 17, 20, 25, 30, 35, 40, 50, 60, 70, or 75 percent, as examples. Higher percentages provide for approaching the set point temperature more quickly, while lower percentages provide for approaching the set point temperature more gradually, avoid hunting, avoid overshoot, are inherently dampened, and are more stable.

In some embodiments, the percentage may vary, for example, depending upon circumstances, may vary depending upon the capacity, may vary depending on whether the floating temperature set point is farther from the input temperature set point, or may vary if the temperature within space 11 is (or has remained) farther from the input temperature set point, as examples. Further, in some embodiments, the time between such adjustments, the percentage, or both, may be selectable or adjustable, for example, by the user, for instance, via thermostat 14t or user interface 14c. In other embodiments, the time between such adjustments, the percentage, or both, may be fixed.

In some embodiments, in addition to evaluating whether the present temperature (e.g., within space 11) is above or below the (e.g., user) input temperature set point, and making adjustments (e.g., in the floating temperature set point) based upon the extent to which the present temperature (e.g., within space 11) is above or below the (e.g., user) input temperature set point, controller 14 may be configured to evaluate or take into consideration the magnitude or sign of the rate of change of the difference between the present temperature (e.g., within space 11) and the (e.g., user) input temperature set point, or simply to use the rate of change (e.g., the first derivative) of the present temperature (e.g., within space 11).

For example, a higher rate of change (e.g., the first derivative) of the present temperature (e.g., within space 11) away from the input set point temperature, may justify a greater change in capacity. In contrast, a higher rate of change of the present temperature (e.g., within space 11) towards the input set point temperature, may warrant a smaller change in capacity, no change at all, or even a change in the opposite direction. In some embodiments, a rate of change (e.g., the first derivative) of the present temperature (e.g., within space 11) may be calculated, for example, by subtracting the present temperature at the last iteration from the current present temperature. Further, in some embodiments, controller 14 may use or take into consideration the second derivative (e.g., the acceleration) of the present temperature (e.g., within space 11). Some embodiments may utilize even higher derivatives.

As mentioned, in many embodiments, the speed of motor 13c varies to change the speed of compressor 17a in the embodiment shown in FIG. 1, to change the capacity (e.g., in BTUh of unit 10). Moreover, in certain embodiments, the first electrical motor 13a or the second electrical motor 13b (or both) is a variable-speed motor, the speed of the (first 13a, second 13b, or both) electrical motor increases as the present temperature (e.g., within space 11) increases, and the speed of the electrical motor decreases as the present temperature decreases, for example, along curve 25. In many such embodiments, the speeds of these fan motors also varies (e.g., corresponding or proportional to that of motor 13c) with curve 25, for instance, as the floating set point temperature changes.

Figure 3:
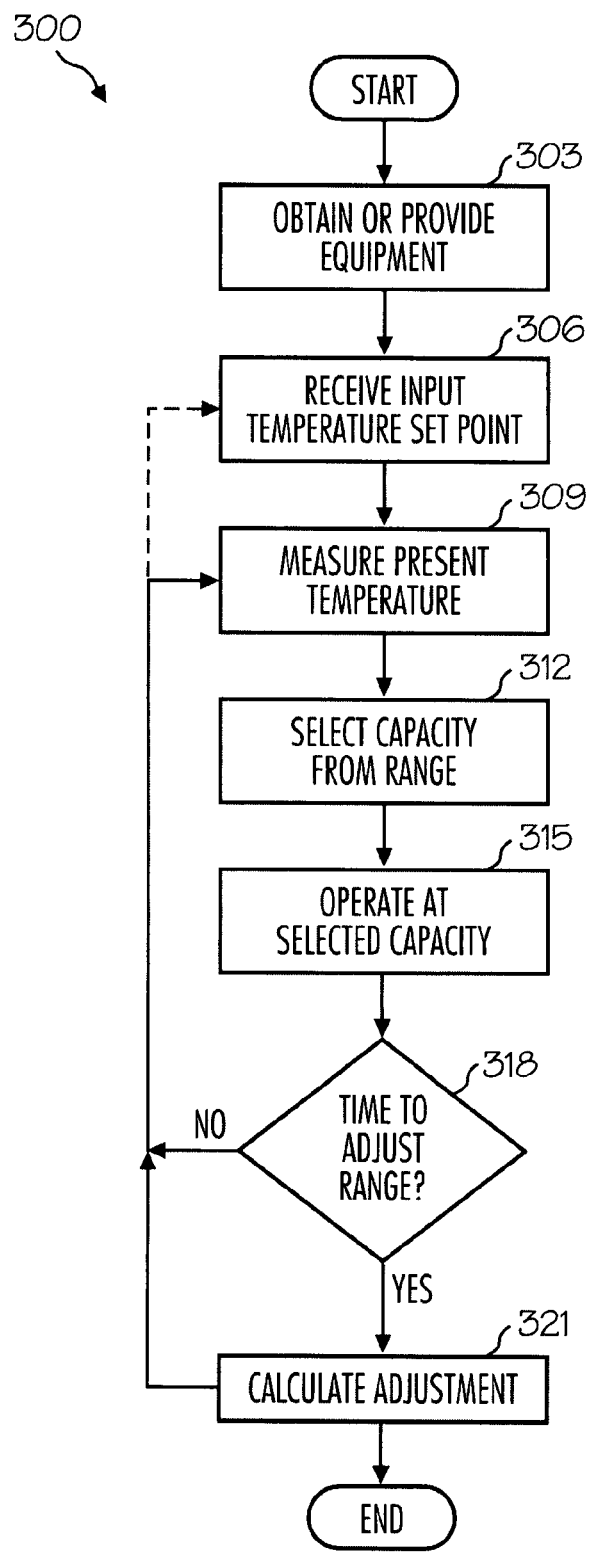
FIG. 3 is a flow chart illustrating examples of various methods, including, as examples, methods of maintaining a substantially constant temperature within a space, and methods of controlling a variable-capacity temperature changing system.

As mentioned, various methods are contemplated, including embodiments of various methods of maintaining a substantially constant temperature within a space (e.g., space 11) within an enclosure (e.g., building 19) by controlling a variable-capacity temperature changing system (e.g., unit 10 or system 10s) to change the temperature within the space (e.g., space 11) by adding heat to, or removing heat from, the space (or both, for example, depending on whether the unit or system is in a heating or cooling mode). Certain methods, or acts therein, may be accomplished, for example, by controller 14, or software operating on controller 14, as examples. FIG. 3 illustrates a number of embodiments of such methods, for instance.

In FIG. 3, method 300 includes an act of inputting or receiving an input temperature set point (act 306). The input temperature set point may be entered, for example, by a person at user interface 14c or thermostat 14t. Method 300 also includes, for example. using an automated process, an act of measuring a present temperature (act 309), for instance, within space 11 (e.g., at sensor 14b) or of air drawn from space 11 (e.g., at sensor 14d). Method 300 also includes (e.g., using an automated process), an act of using at least the present temperature (e.g., measured in act 309) within space 11, varying the capacity of the variable-capacity temperature changing system (e.g., varying the speed of compressor 17a in unit 10 or system 10s) over at least part of a capacity range (e.g., curve 25 shown in FIG. 2). In some embodiments, as shown in FIG. 3, varying the capacity of the variable-capacity temperature changing system may include selecting a capacity from a range (act 312), for example, from curve 25 shown in FIG. 2 (e.g., using the present temperature measured in act 309), and operating (e.g., unit 10, system 10s, compressor 17a, or motor 13c) at the selected (e.g., in act 312) capacity (act 315).

In some such embodiments, for example, the capacity range (e.g., curve 25 used in act 312) extends (e.g., continuously or in discrete capacity increments) from a minimum capacity (e.g., 13,170 BTUh at step 21a), through at least two intermediate capacities (e.g., at steps 21b to 21j), to a maximum capacity (e.g., 42,144 BTUh at 21k). Also in these embodiments, the capacity range (e.g., from 13,170 BTUh at step 21a to 42,144 BTUh at step 21k) corresponds to a temperature range (e.g., −2.00 degrees F. at step 21a to 3.00 degrees F. at step 21k, relative to the temperature set point, as shown in FIG. 2). In some such embodiments, the temperature range extends (e.g., continuously or in at least four temperature increments) from a first end temperature (e.g., −2.00 degrees F. at step 21a, relative to the temperature set point), through at least two intermediate temperatures (e.g., at steps 21b to 21j), to a second end temperature (e.g., 3.00 degrees F. at step 21k, relative to the temperature set point).

In some such embodiments (e.g., in act 312), the first end temperature (e.g., −2.00 degrees F., relative to the temperature set point) corresponds (e.g., at step 21a) to the minimum capacity (e.g., 13,170 BTUh), and the second end temperature (e.g., 3.00 degrees F., relative to the temperature set point) corresponds to the maximum capacity (e.g., 42,144 BTUh), and the input temperature set point (e.g., received in act 306) is in between the first end temperature (e.g., −2.00 degrees F., relative to the temperature set point), and the second end temperature (e.g., 3.00 degrees F., relative to the temperature set point) of the temperature range (e.g., curve 25).

As illustrated by method 300, such methods may also include (e.g., using an automated process) repeating multiple times the varying (e.g., in acts 312 and 315) of the capacity of the variable-capacity temperature changing system (e.g., unit 10) over at least part of the capacity range (e.g., of curve 25), and (e.g., using an automated process), using at least the present temperature within the space (e.g., measured in act 309) and the input temperature set point (e.g., received in act 306), adjusting the temperature range (e.g., in act 321), for instance, to bring the present temperature (e.g., of space 11, that is measured in act 309) closer to the input temperature set point (e.g., received in act 306). In this particular activity, the adjusting of the temperature range (e.g., in act 321) may include changing the temperature at which a particular capacity (e.g., increment) corresponds, for at least two of the capacities (e.g., corresponding to steps 21a to 21k) within the capacity range (e.g., of curve 25). Some of these embodiments also include (e.g., using an automated process), repeating multiple times the adjusting of the temperature range (e.g., act 321) to bring the present temperature (e.g., of space 11) closer to the input temperature set point (e.g., received in act 306).

Further, in some embodiments, in the varying of the capacity of the variable-capacity temperature changing system over a capacity range (e.g., acts 312 and 315), the temperature range (e.g., of curve 25) consists of at least four discrete capacity increments (e.g., corresponding to steps 21a to 21k), the temperature range consists of at least four discrete temperature increments (e.g., also corresponding to steps 21a to 21k), each of the temperature increments has a corresponding capacity increment (e.g., at each of steps 21a to 21k), each of the capacity increments has a corresponding temperature increment (e.g., at each of steps 21a to 21k), and from the minimum capacity (e.g., at steps 21a) to the maximum capacity (e.g., at step 21k), each capacity increment has a higher capacity than the previous capacity increment. For example, in some embodiments, in a cooling mode, curve 25 maintains a positive slope along its length (e.g., from one end the range to the other or from step 21a to step 21k). Further, in some embodiments, in a heating mode, curve 25 maintains a negative slope along its length (e.g., from one end the range to the other).

Even further, in certain embodiments, in the adjusting of the temperature range (e.g., in act 321) to bring the present temperature (e.g., of space 11) closer to the input temperature set point (e.g., received in act 306), the adjusting (e.g., act 321) includes moving the temperature range (e.g., from step 21a to 21k) by a percentage of a difference between the present temperature (e.g., measured in act 309) within space 11, and the input temperature set point (e.g., received in act 306). In some embodiments, this percentage (e.g., used in act 321) is greater than zero (0) percent and less than one hundred (100) percent, for example. In fact, in particular embodiments, in the adjusting of the temperature range (e.g., in act 321) to bring the present temperature closer to the input temperature set point, the percentage is greater than two (2) percent and less than fifty (50) percent. Such a percentage may be ten (10) percent, for example.

In some embodiments, in the adjusting of the temperature range to bring the present temperature closer to the input temperature set point (e.g., in act 321), the adjusting is performed at substantially regular intervals of time (e.g., evaluated in act 318). Such intervals of time (e.g., evaluated in act 318) may be greater than one second and less than one hour, for example. In some embodiments, the interval of time (e.g., evaluated in act 318) may be one minute, for instance.

Many of these embodiments also include obtaining or providing (or both) certain equipment (e.g., in act 303), for example. an air conditioning unit (e.g., unit 10). In such embodiments, the air conditioning unit (e.g., unit 10) may be the variable-capacity temperature changing system mentioned above, and the air conditioning unit (e.g., unit 10) may have a variable-speed compressor (e.g., compressor 17a driven by motor 13c, which is driven by variable-speed drive 15). In some such embodiments, the varying of the capacity of the variable-capacity temperature changing system (e.g., unit 10) over a capacity range (e.g., from step 21a to 21k) includes varying the speed of compressor 17a.

Furthermore, certain embodiments provide methods of maintaining a substantially constant temperature within a space (e.g., space 11) using, for instance, a variable-capacity HVAC unit (e.g., unit 10). Such methods, also illustrated by method 300, may include the acts of inputting or receiving an input temperature set point (e.g., act 306), (e.g., using an automated process), measuring a present temperature (e.g., act 309), for instance, within space 11, and (e.g., using an automated process), using the present temperature within space 11 (e.g., measured in act 309), determining (e.g., in act 312) a present capacity (e.g., corresponding to one of steps 21a to 21k) at which to operate the HVAC unit (e.g., unit 10) such that the present capacity (e.g., the speed of compressor 17a) changes relative to an offset of the present temperature (e.g., measured in act 309) within space 11 from a floating temperature set point (e.g., determined in act 321).

Particular methods may include (e.g., using an automated process), operating the HVAC unit (e.g., unit 10) at a present capacity, (e.g., using an automated process), repeating multiple times the measuring of the present temperature (e.g., in act 309), the determining of the present capacity (e.g., in act 312), and the operating at the present capacity (e.g., act 315). Such embodiments may also include (e.g., using an automated process), changing the floating temperature set point (e.g., in act 321) based on the input temperature set point (e.g., received in act 306) and the present temperature (e.g., measured in act 309), for example, within space 11, and repeating multiple times the measuring of the present temperature (e.g., act 309), the determining of the present capacity (e.g., act 312), the operating at the present capacity (e.g., act 315), the repeating of the measuring (e.g., act 309), the determining (e.g., act 312), and the operating (e.g., act 315), and the changing (e.g., act 321) of the floating temperature set point.

In many such methods, the changing of the floating temperature set point (e.g., act 321) is performed at regular intervals of time (e.g., evaluated in act 318), and in some embodiments, the changing of the floating temperature set point (e.g., act 321) includes changing the floating temperature set point by a predetermined percentage of a difference between the input temperature set point (e.g., received in act 306) and the present temperature (e.g., measured in act 309). In certain embodiments, the HVAC unit (e.g., unit 10) includes a variable-speed compressor (e.g., compressor 17a driven by motor 13c and drive 15), and the operating of the HVAC unit (e.g., unit 10) at the present capacity (e.g., in act 315) includes controlling the speed of the compressor (e.g., controlling the output of drive 15 using controller 14), and the determining of the present capacity (e.g., in act 312) includes selecting a lower speed of the compressor (e.g., 17a, for example, by selecting a lower frequency or voltage produced by drive 15) as the present temperature (e.g., measured in act 309) decreases, and selecting a higher speed of the compressor (e.g., 17a) as the present temperature (e.g., measured in act 309) increases.

Further, in some embodiments, the HVAC unit (e.g., unit 10) includes an evaporator coil (e.g., 15e) and a first fan (e.g., 12a) configured and positioned to move air through the evaporator coil (e.g., 15e) and to the space (e.g., 11), and the operating of the HVAC unit at the present capacity (e.g., act 315) includes controlling the speed of the first fan (e.g., 12a), and the determining of the present capacity (e.g., in act 312) includes selecting a lower speed of the first fan (e.g., 12a) as the present temperature (e.g., measured in act 309) decreases, and selecting (e.g., in act 312) a higher speed of the first fan (e.g., 12a) as the present temperature (e.g., measured in act 309) increases.

The invention also provides a number of systems and methods of controlling a variable-capacity temperature changing system, some of which utilize an asymmetrical band. Unit 10 and system 10s provide examples of such a system, and method 300 illustrates an example of such a method. Certain such methods may include at least the acts of receiving or inputting (e.g., in act 306) an input temperature set point (e.g., using an automated process), measuring a present temperature within the space (e.g., in act 309, for example, of space 11), and using at least the present temperature within the space (e.g., measured in act 309), varying the capacity of the variable-capacity temperature changing system (e.g., in acts 312 and 315) over at least part of a capacity range (e.g., corresponding to curve 25). In such embodiments, the capacity range (e.g., corresponding to curve 25) extends in capacity increments from a minimum capacity (e.g., at step 21a), through at least two intermediate capacities (e.g., corresponding to any two or more of steps 21b to 21j), to a maximum capacity (e.g., corresponding to step 21k).

In many embodiments, the capacity range (e.g., 13,170 BTUh to 42,144 BTUh for curve 25 shown in FIG. 2) corresponds to a temperature range (e.g., −2.00 degrees F. to 3.00 degrees F. deviation from a set point for curve 25) that extends in at least four temperature increments (e.g., of steps 21a to 21k) from a first end temperature (e.g., corresponding to step 21a), through at least two intermediate temperatures (e.g., corresponding to two or more of steps 21b to 21j), to a second end temperature (e.g., corresponding to step 21k). In such embodiments, the first end temperature may correspond to the minimum capacity (e.g., at step 21a), the second end temperature may correspond to the maximum capacity (e.g., at step 21k), the input temperature set point may be selected to be in between the first end temperature (e.g., at step 21a) and the second end temperature (e.g., at step 21k) of the temperature range (e.g., of curve 25).

In particular embodiments, the range is selected such that the input temperature set point (e.g., received in act 306) is closer to one end of the temperature range than to the other end of the temperature range. For example, in FIG. 2, curve 25 is selected such that the input temperature set point corresponds to step 21h, which provides a capacity of 35,998 BTUh, which is closer to the maximum capacity of 42,144 BTUh at step 21k than to the minimum capacity of 13,170 BTUh at step 21a. Further, in this embodiment, step 21h is the eighth step of 11, making step 21h closer to step 21k than to step 21a. Such embodiments may also include (e.g., using an automated process) repeating multiple times the varying of the capacity (e.g., acts 312 and 315) of the variable-capacity temperature changing system (e.g., unit 10), for instance, over the capacity range (e.g., of curve 25).

Some such embodiments also include (e.g., using an automated process) using at least the present temperature (e.g., measured in act 309) within the space (e.g., space 11) and the input temperature set point (e.g., received in act 306), adjusting (e.g., in act 312) the temperature range (e.g., of curve 25) to bring the present temperature (e.g., of space 11, measured in later iterations of act 309) closer to the input temperature set point (e.g., received in act 306). In some such embodiments, the adjusting of the temperature range (e.g., in act 312) includes changing the temperature at which a particular capacity increment corresponds, for at least two of the capacities within the capacity range (e.g., at least two of steps 21a to 21k of curve 25).

In some embodiments, in the varying of the capacity of the variable-capacity temperature changing system over a capacity range (e.g., acts 312 and 315), each of the temperature increments has a corresponding capacity increment (e.g., as illustrated in FIG. 2 for steps 21a to 21k), each of the capacity increments has a corresponding temperature increment, and the temperature increments and the capacity increments vary with a consistently positive slope (e.g., in a cooling mode) from the minimum capacity (e.g., at step 21a) to the maximum capacity (e.g., at step 21k) and from the first end temperature (e.g., at step 21a) to the second end temperature (e.g., at step 21k). Although consistently positive, in some embodiments, the slope may change through such a range, for example, as illustrated for curve 25. Other embodiments may have a consistently negative slope, for example, in a heating mode.

Further, some embodiments (e.g., of method 300) include obtaining or providing (or both) an air conditioning unit (e.g., unit 10) that serves as the variable-capacity temperature changing system, and that has a variable-speed compressor (e.g., compressor 17a, driven by motor 13c, that is driven by drive 15, as described herein). In such embodiments, the varying of the capacity of the variable-capacity temperature changing system over a capacity range may include varying the speed of the compressor (e.g., 17a).

Various needs, objects, benefits, other advantages, and solutions to problems have been described herein with regard to specific embodiments. However, the needs, objects, benefits, advantages, solutions to problems, and element(s) that may cause benefit, advantage, or solution to occur or become more pronounced are not to be construed as critical, required, or essential features or elements of the claims or the invention. Reference to an element in the singular is not intended to mean "one and only one" unless explicitly so stated, but rather "one or more." As used herein, the terms "comprises", "comprising", or a variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. An apparatus for maintaining a substantially constant temperature within a space within an enclosure, the apparatus comprising:
    a variable-capacity temperature changing system for changing the temperature within the space by at least one of adding heat to or removing heat from the space;
    a temperature sensor positioned and configured to sense a present temperature within at least one of the space or air drawn from the space;
    an input device configured to receive an input temperature set point from an operator of the temperature changing system;
    a controller that is in communication with the input device and in control of the variable-capacity temperature changing system, wherein the controller is configured to automatically continuously gradually change the capacity of the variable-capacity temperature changing system so that the temperature within the space asymptotically approaches the input temperature set point, and wherein the controller comprises:
        a first control means for changing the capacity of the variable-capacity temperature changing system over a range of present temperatures within the space, wherein the first control means provides a maximum capacity at a first end of the range, a minimum capacity at a second end of the range, and at least two gradually differing intermediate capacities between the ends of the range, and
        a second control means for automatically moving the range, wherein the second control means moves the range less frequently than the first control means changes the capacity.

2. The apparatus of claim 1 wherein the second control means moves the range based on a difference between the present temperature and the input temperature set point.

3. The apparatus of claim 1 wherein the controller comprises a digital processor and the variable-capacity temperature changing system for changing the temperature within the space comprises:
    a compressor configured to compress a refrigerant;
    a condenser configured to cool and condense the refrigerant after the refrigerant is compressed by the compressor;
    an expansion device having an inlet and an outlet and configured to pass the refrigerant from the inlet to the outlet while maintaining a substantially higher pressure at the inlet than at the outlet;
    an evaporator coil positioned and configured to receive the refrigerant from the expansion device and to cool supply air to be delivered to the space;
    a first fan positioned and configured to move the supply air through the evaporator coil and to the space;
    a second fan positioned and configured to move outside air through the condenser;
    a first electrical motor connected to and configured to turn the first fan;
    a second electrical motor connected to and configured to turn the second fan;
    a third electrical motor connected to and configured to turn the compressor;
    at least one variable-speed drive unit configured and electrically connected to drive at least the third electrical motor at least three different speeds.

4. A direct expansion air conditioning unit for cooling a space within an enclosure and maintaining a substantially constant temperature within the enclosure, the air conditioning unit comprising:
    a compressor configured to compress a refrigerant;
    a condenser configured to cool and condense the refrigerant after the refrigerant is compressed by the compressor;
    an expansion device having an inlet and an outlet and configured to pass the refrigerant from the inlet to the outlet while maintaining a substantially higher pressure at the inlet than at the outlet;
    an evaporator coil positioned and configured to receive the refrigerant from the expansion device and to cool supply air to be delivered to the space;
    a first fan positioned and configured to move the supply air through the evaporator coil and to the space;
    a second fan positioned and configured to move outside air through the condenser;
    a first electrical motor connected to and configured to turn the first fan;
    a second electrical motor connected to and configured to turn the second fan;
    a third electrical motor connected to and configured to turn the compressor;

at least one variable-speed drive unit configured and electrically connected to drive at least the third electrical motor at least three different speeds;

a temperature sensor positioned and configured to sense a present temperature within at least one of the space or return air drawn from the space;

an input device configured to receive an input temperature set point from an operator of the air conditioning unit;

a controller that is in communication with the input device and the at least one variable-speed drive unit, wherein the controller is configured to control the speed of at least the third electrical motor, wherein the controller is configured to cause the at least one variable-speed drive unit to increase the speed of at least the third electrical motor as the present temperature increases, and to cause the at least one variable-speed drive unit to decrease the speed of at least the third electrical motor as the present temperature decreases, and wherein the controller selects a present speed of at least the third electrical motor using a floating temperature set point, wherein the controller is configured to change the floating temperature set point based on whether the present temperature is above or below the input temperature set point.

5. The air conditioning unit of claim 4 wherein the controller is configured to increase the floating temperature set point if the present temperature is below the input temperature set point, the controller is configured to decrease the floating temperature set point if the present temperature is above the input temperature set point, and the controller is configured to change the floating temperature set point at regular intervals of time.

6. The air conditioning unit of claim 4 wherein the controller is configured to change the floating temperature set point by a predetermined percentage of a difference between the input temperature set point and the present temperature.

7. The air conditioning unit of claim 4 wherein the first electrical motor is a variable-speed motor, and wherein the speed of the first electrical motor increases as the present temperature increases, and the speed of the first electrical motor decreases as the present temperature decreases.

8. The air conditioning unit of claim 7 wherein the second electrical motor is a variable-speed motor, and wherein the speed of the second electrical motor increases as the present temperature increases, and the speed of the second electrical motor decreases as the present temperature decreases.

9. The air conditioning unit of claim 4 comprising a single enclosure for the air conditioning unit, wherein the compressor, the condenser coil, the expansion device, the evaporator coil, the first fan, the second fan, the first electrical motor, the second electrical motor, the third electrical motor, and the at least one variable-speed drive unit are all located within the single enclosure, wherein the controller comprises a digital processor, and wherein the air conditioning unit is marketed for residential applications.

10. A building comprising the air conditioning unit of claim 4, wherein the building forms the enclosure.

11. A method of maintaining a substantially constant temperature within a space within an enclosure by controlling a variable-capacity temperature changing system to change the temperature within the space by at least one of adding heat to or removing heat from the space, the method comprising at least the acts of:

inputting an input temperature set point;

using an automated process, measuring a present temperature within the space;

using an automated process, using at least the present temperature within the space, varying the capacity of the variable-capacity temperature changing system over at least part of a capacity range, wherein the capacity range extends from a minimum capacity, through at least two intermediate capacities, to a maximum capacity, and wherein the capacity range corresponds to a temperature range, wherein the temperature range extends from a first end temperature, through at least two intermediate temperatures, to a second end temperature, wherein the first end temperature corresponds to the minimum capacity and the second end temperature corresponds to the maximum capacity, and wherein the input temperature set point is in between the first end temperature and the second end temperature of the temperature range;

using an automated process, repeating multiple times the varying of the capacity of the variable-capacity temperature changing system over at least part of the capacity range;

using an automated process, using at least the present temperature within the space and the input temperature set point, adjusting the temperature range to bring the present temperature closer to the input temperature set point, wherein the adjusting of the temperature range includes changing the temperature at which a particular capacity corresponds, for at least two of the capacities within the capacity range.

12. The method of claim 11 further comprising, using an automated process, repeating multiple times the adjusting the temperature range to bring the present temperature closer to the input temperature set point.

13. The method of claim 11 wherein, in the varying of the capacity of the variable-capacity temperature changing system over a capacity range, the temperature range consists of at least four discrete capacity increments, the temperature range consists of at least four discrete temperature increments, each of the temperature increments has a corresponding capacity increment, each of the capacity increments has a corresponding temperature increment, and from the minimum capacity to the maximum capacity, each capacity increment has a higher capacity than the previous capacity increment.

14. The method of claim 11 wherein, in the adjusting of the temperature range to bring the present temperature closer to the input temperature set point, the adjusting includes moving the temperature range by a percentage of a difference between the present temperature within the space and the input temperature set point, wherein the percentage is greater than zero percent and less than 100 percent.

15. The method of claim 14 wherein, in the adjusting of the temperature range to bring the present temperature closer to the input temperature set point, the percentage is greater than two percent and less than 50 percent.

16. The method of claim 11 wherein, in the adjusting of the temperature range to bring the present temperature closer to the input temperature set point, the adjusting is performed at substantially regular intervals of time, wherein the intervals of time are greater than one second and less than one hour.

17. The method of claim 11 further comprising at least one of obtaining or providing an air conditioning unit, wherein the air conditioning unit is the variable-capacity temperature changing system, wherein the air conditioning unit has a variable-speed compressor, and wherein the varying of the capacity of the variable-capacity temperature changing system over a capacity range includes varying the speed of the compressor.

18. The method of claim 11 further comprising the acts of:

using an automated process, using the present temperature within the space, determining a present capacity at which to operate the HVAC unit wherein the present capacity changes relative to an offset of the present temperature within the space from a floating temperature set point;

using an automated process, operating the HVAC unit at the present capacity;

using an automated process, repeating multiple times the measuring of the present temperature, the determining of the present capacity, and the operating at the present capacity;

using an automated process, changing the floating set point based on the input temperature set point and the present temperature within the space; and using an automated process, repeating multiple times the measuring of the present temperature, the determining of the present capacity, the operating at the present capacity, the repeating of the measuring, the determining, and the operating, and the changing of the floating temperature set point.

19. The method of claim 18 wherein the changing of the floating temperature set point is performed at regular intervals of time.

20. The method of claim 18 wherein the changing of the floating temperature set point comprises changing the floating temperature set point by a predetermined percentage of a difference between the input temperature set point and the present temperature.

21. The method of claim 18 wherein the HVAC unit comprises a variable-speed compressor, and the operating of the HVAC unit at the present capacity includes controlling the speed of the compressor, wherein the determining of the present capacity includes selecting a lower speed of the compressor as the present temperature decreases, and wherein the determining of the present capacity includes selecting a higher speed of the compressor as the present temperature increases.

22. The method of claim 21 wherein the HVAC unit comprises an evaporator coil and a first fan configured and positioned to move air through the evaporator coil and to the space, and wherein the operating of the HVAC unit at the present capacity includes controlling the speed of the first fan, wherein the determining of the present capacity includes selecting a lower speed of the first fan as the present temperature decreases, and wherein the determining of the present capacity includes selecting a higher speed of the first fan as the present temperature increases.

23. The method of claim 11 wherein the capacity range extends in capacity increments, the temperature range extends in at least four temperature increments, and the input temperature set point is closer to one end of the temperature range than to the other end of the temperature range.

24. The method of claim 23 wherein, in the varying of the capacity of the variable-capacity temperature changing system over a capacity range, each of the temperature increments has a corresponding capacity increment, each of the capacity increments has a corresponding temperature increment, and the temperature increments and the capacity increments vary with a consistently positive slope from the minimum capacity to the maximum capacity and from the first end temperature to the second end temperature.

25. The method of claim 23 further comprising at least one of obtaining and or providing an air conditioning unit, wherein the air conditioning unit is the variable-capacity temperature changing system, wherein the air conditioning unit has a variable-speed compressor, and wherein the varying of the capacity of the variable-capacity temperature changing system over a capacity range includes varying the speed of the compressor.

\* \* \* \* \*

UNITED STATES PATENT AND TRADEMARK OFFICE
CERTIFICATE OF CORRECTION

PATENT NO. : 7,770,806 B2 Page 1 of 1
APPLICATION NO. : 11/820521
DATED : August 10, 2010
INVENTOR(S) : Herzon et al.

It is certified that error appears in the above-identified patent and that said Letters Patent is hereby corrected as shown below:

At column 28, line 26, delete "and".

Signed and Sealed this

Twenty-third Day of November, 2010

David J. Kappos
*Director of the United States Patent and Trademark Office*